April 22, 1958   J. KRITZ   2,831,348
APPARATUS FOR SUPPRESSING UNDESIRABLE
MODES IN ULTRASONIC FLOWMETERS
Original Filed Feb. 3, 1951   5 Sheets-Sheet 2

INVENTOR.
Jack Kritz
BY
Moses, Nolte, Crews & Berry
ATTORNEYS

April 22, 1958  J. KRITZ  2,831,348
APPARATUS FOR SUPPRESSING UNDESIRABLE
MODES IN ULTRASONIC FLOWMETERS
Original Filed Feb. 3, 1951  5 Sheets-Sheet 3

INVENTOR.
Jack Kritz
BY
Moses, Nolte, Cruet & Berry
ATTORNEYS

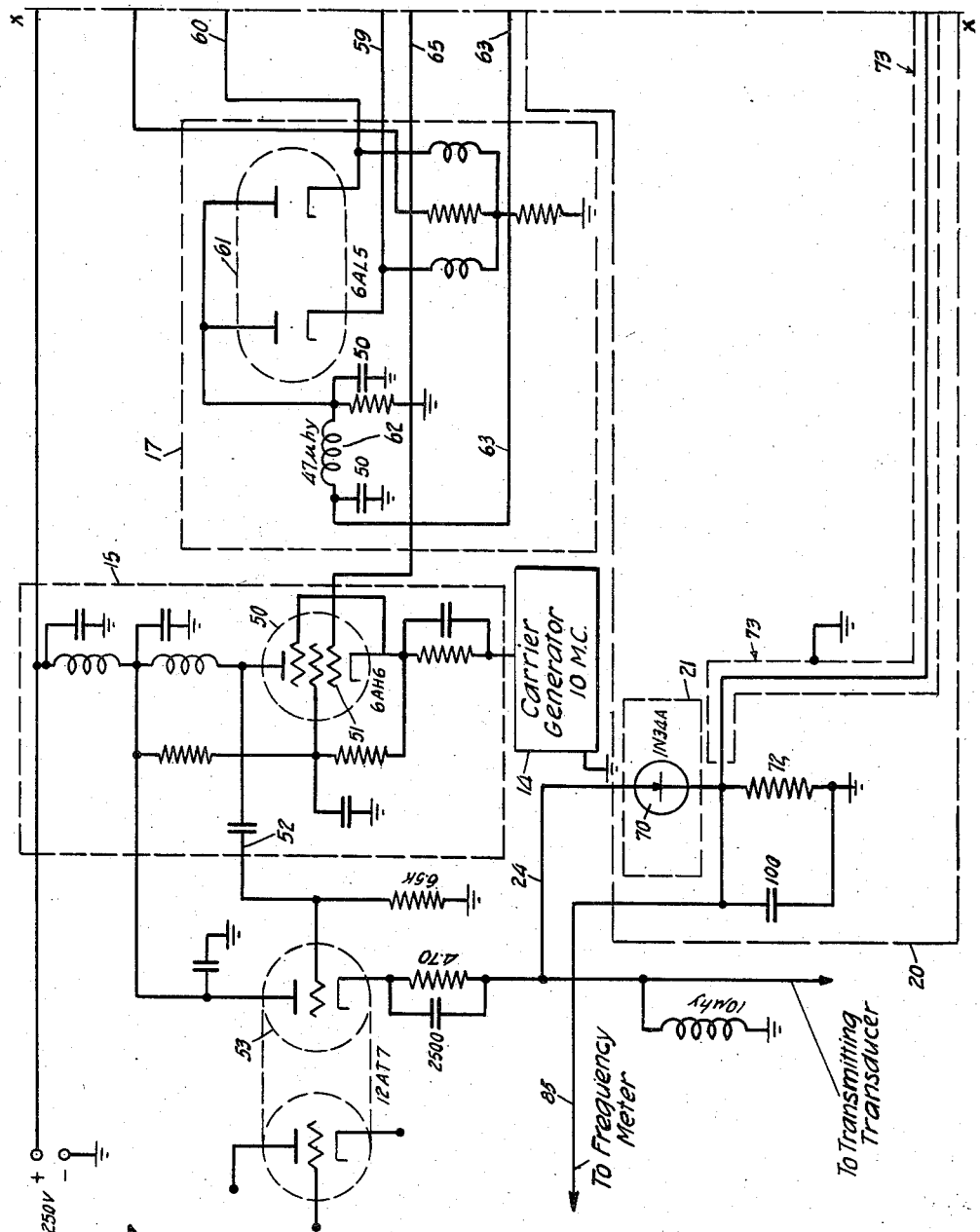

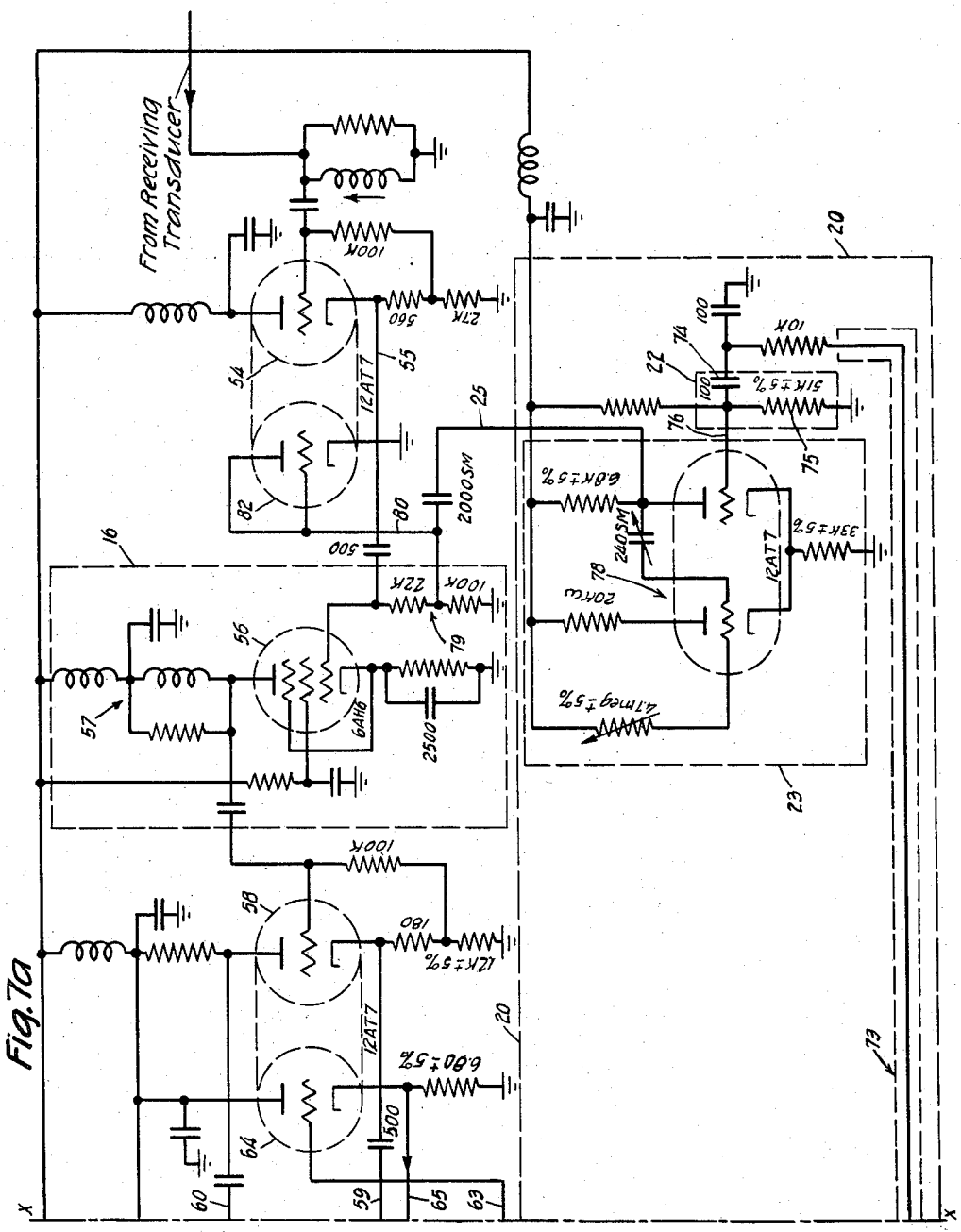

United States Patent Office 2,831,348
Patented Apr. 22, 1958

2,831,348

APPARATUS FOR SUPPRESSING UNDESIRABLE MODES IN ULTRASONIC FLOWMETERS

Jack Kritz, Flushing, N. Y.

Application August 14, 1953, Serial No. 374,358

5 Claims. (Cl. 73—194)

The present invention relates to an apparatus for suppressing undesirable modes of oscillations, and more particularly to an arrangement for suppressing undesirable modes of oscillations occurring in wide band oscillatory systems, such as ultrasonic flow meters.

Broad band oscillatory systems in which the oscillatory loop includes an element which has a variable time constant present the problem that these systems will oscillate in modes depending on how they happen to get started. Since the frequency of oscillation is not fixed—the element having a variable time constant preventing this—it is not feasible to include filter circuits in the oscillatory loop, to determine the mode of oscillation. The use of filters, which by their nature introduce time delays, is incompatible with the broad band (small time delay) requirements.

In the operation of ultrasonic flow meters, the frequency of oscillation of the oscillatory loop depends on the velocity of ultrasonic propagation in the fluid, as well as on the flow velocity of the fluid under consideration. The frequency of such a loop is measured and compared with the frequency of the loop with the fluid at rest, or with the frequency of a second, similar loop having a different orientation with respect to the flow of the fluid than the first loop. Flow meters operating on this principle are described in my copending application Serial No. 67,503 filed December 27, 1948, Serial No. 209,295 filed February 3, 1951 and now abandoned and Serial No. 209,296 filed February 3, 1951 and now abandoned, of which application the present case is a continuation-in-part. In a flow meter having a pair of loops it is important that both loops operate on the same known mode. Otherwise, dependable readings cannot be obtained under commercial or field conditions.

It is accordingly an object of the present invention to provide an apparatus to suppress undesirable modes in oscillatory loops.

It is a further object of the invention to provide a mode suppressor for use with a flow meter to suppress undesirable modes which might occur due to momentary interruptions of the signal received by the receiving transducer, for example, due to a chattering switch, obstructions passing by in the stream of the fluid, starting transients, etc.

With these objects in view, the invention comprises apparatus for suppressing undesirable modes of oscillation in an oscillatory circuit by generating an impulse from the oscillatory circuit upon starting of oscillations; timing the thus generated impulse to be of longer duration than the time required from the start of oscillations to the first premature, undesirable reversal of signal that can be caused by an unwanted mode; and controlling the oscillatory circuit by the thus timed impulse. The control of the oscillatory circuit may be accomplished by applying the generated impulse as a paralyzing signal to the oscillatory circuit, so as to prevent the starting of undesirable modes of oscillations by maintaining the condition of the oscillatory circuit in the condition it was in when the oscillation started.

According to a feature of the invention, I provide a circuit arrangement to suppress undesirable modes of oscillations which comprises a detector circuit to detect the signal furnished by the oscillatory circuit so as to obtain therefrom an impulse upon the start of oscillations. The impulse is then applied to a differentiating circuit where a signal is obtained in accordance with the rate of rise of the impulse; and this signal is applied to a timing circuit to furnish a timed pulse of predetermined duration (synchronized to start with the rise of the detected signal, i. e. the impulse) which however will be longer under all circumstances than the time required from the start of oscillations to the first premature, undesirable reversal of signal that can be caused by the undesirable mode. This timed pulse is then applied any place in the oscillatory loop (for example to an amplifier) to prevent a change in the mode of oscillation of the loop, for example by paralyzing the operating of a component thereof for the duration of the timed pulse.

In the accompanying drawings I have shown a mode suppressor according to the invention, incorporated in, and applied to a flow meter. It is to be understood, however, that such a mode suppressor is equally applicable to other broad band oscillatory loops, and the drawing and detailed description refers to the flow meter only by way of illustration of one possible application.

Figures 7 and 7a are a schematic circuit diagram illustrating the detailed circuit of the mode suppressor applied to a flow meter, Figure 7a being a continuation of Figure 7 and deemed to be joined thereto at lines x—x.

Figure 1:
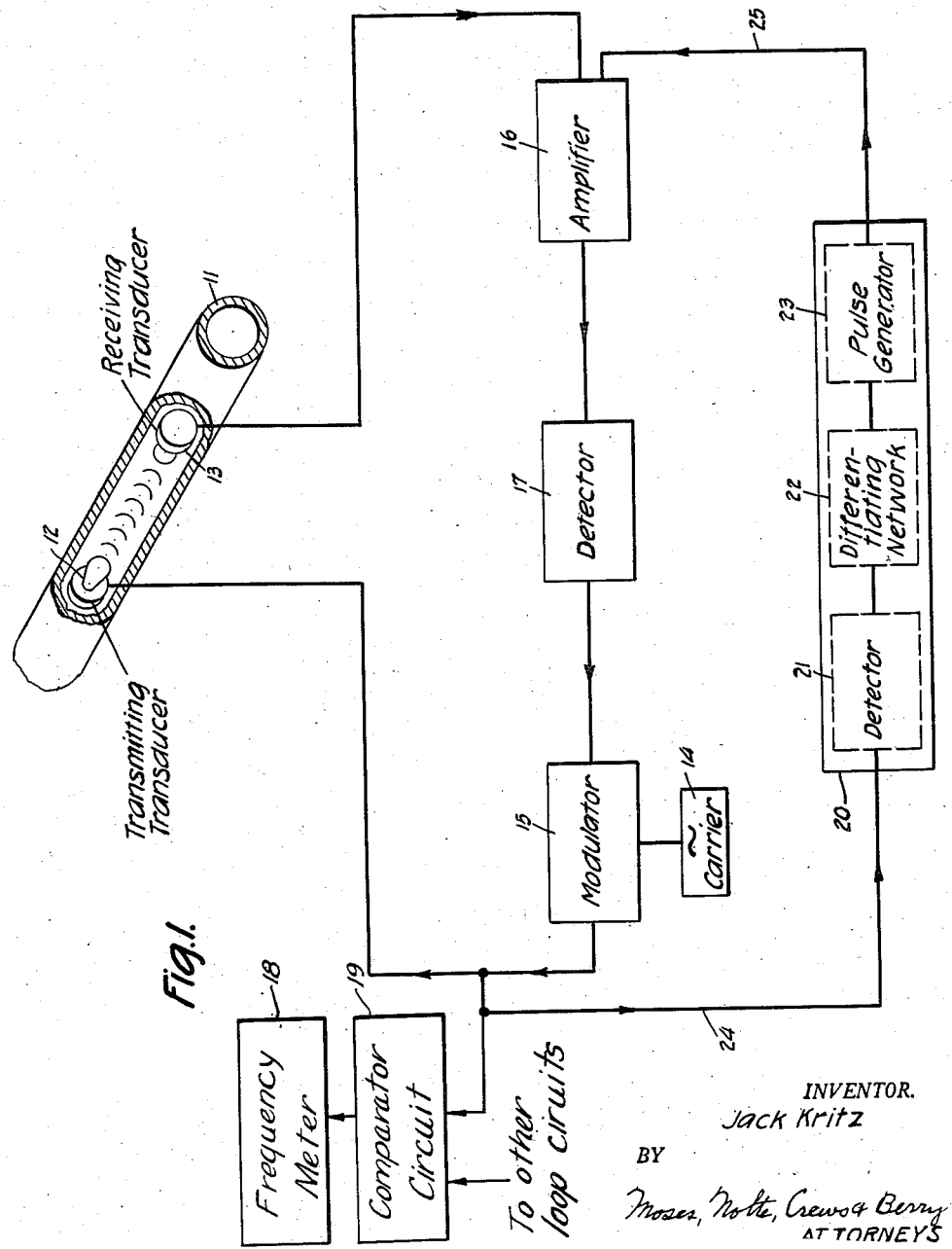
Figure 1 is a block diagram of a mode suppressor applied to a flow meter.

Referring now specifically to Figure 1, the fluid whose velocity is to be measured is conducted through a tube 11. Transmitting and receiving transducers 12 and 13 are connected with the tube to transmit supersonic waves through the fluid medium from transmitter 12 to receiver 13. Carrier excitation is furnished by carrier generator 14 to a modulator 15, through which the signal will be conducted to the transmitter 12. This signal will remain "on" so long as no received signal is impressed on modulator 15 to turn it off.

Figure 2:
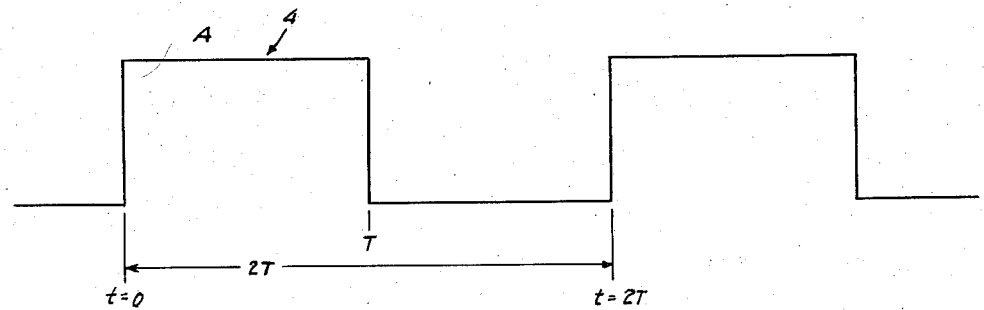
Figure 2 is a diagram of the wave form in a flow meter under normal condition.
Figure 3:
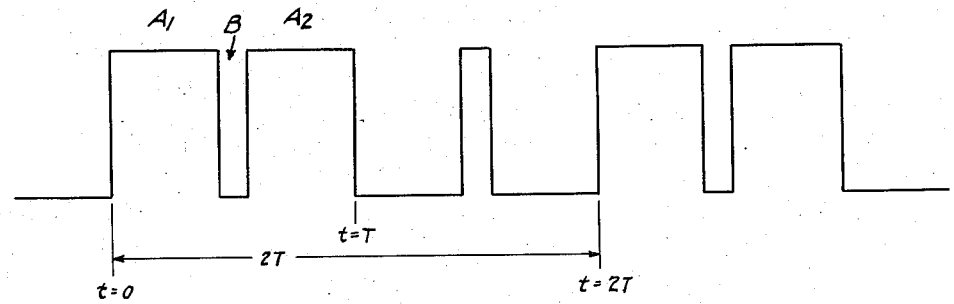
Figure 3 is a diagram similar to that of Figure 2 showing an interruption and subsequent sustained generation of an unwanted mode.

When a signal is received by receiver 13, it is amplified by amplifier 16, detected in detector 17 and then serves to turn off the signal furnished to the system by applying a blocking signal to modulator 15. The carrier frequency signal applied to the transmitting transducer 12 will then be a square wave of period 2T as shown in Figure 2, where T is the transit time of ultrasonic vibrations from the transmitting transducer 12 to the receiving transducer 13. If for any reason after the starting time ($t=0$) the signal is momentarily interrupted, for example due to such effects as an improperly functioning switch, a loose connection, starting transients, or obstructions passing by in the fluid stream, then the wave will appear as shown in Figure 3, and will continue in that form until another interruption alters its character. As shown, the normal signal "A" of Figure 2 is now interrupted into parts $A_1$ and $A_2$ (Fig. 3) by a break B.

The basic oscillatory frequency of Figure 3 is three times that of Figure 2. For an arrangement as illustrated, any odd mode, 3, 5, 7, etc. times the basic frequency may be started. Such undesirable modes will always be an odd integral multiple of what may be termed the fundamental mode, illustrated in Figure 2.

It is to be noted that the oscillatory circuit of Figure 1 can also be constructed so that the modulator normally is "off" and no excitation is supplied to the transmitting transducer 12 except when a signal is received. Such an arrangement will oscillate at a fundamental period of T (instead of 2T as in the arrangement of Fig. 1) and the undesirable modes will be even multiples of the fundamental mode, e. g., 2, 4, 6, etc. times higher than the fundamental. It is preferred, however, to use an arrangement according to Figure 1, since it is self-starting and the separation of the nearest mode frequency from the fundamental mode is greater than for the alternate arrangement just described, i. e., $3f_0-f_0=2f_0$ for the arrangement according to Figure 1, against $2f_0-f_0=f_0$ for the alternate form, where $f_0$ is the frequency of the fundamental mode.

The mode suppressor is generally indicated at 20, and it is connected by means of lead 24 to the oscillatory loop, as shown in Figure 1, so that a portion of the signal applied to transmitting transducer 12 is applied to the mode suppressor 20. The mode suppressor comprises a detector 21, a differentiating network 22, and a pulse generator 23. A sample of the signal on the transmitting transducer 12 is detected in detector 21, and then differentiated in differentiating network 22 to produce a signal coincident with the rise of signal voltage on the transmitting transducer 12. The differentiating network may be, for example, a resistance-capacitance network, or a resistance-inductance network, blocking oscillators, or other circuits which will produce a signal initiated by a rise of voltage, as is well known in the art. A resistance-capacitance network is preferred, due to its simplicity. This signal is utilized to produce a pulse of known time duration. The circuit producing this timed pulse may be a monostable multivibrator, and is so designed that the time duration of the timed pulse is just slightly smaller than the shortest transit time for the ultrasonic waves through the fluid, in view of the variety of fluids, and changes in velocity of flow intended to be measured. Figure 1 shows a connection 25 from the mode suppressor to the input circuit of the R.-F. amplifier, the connection being such to prevent amplification of any received signals for the duration of the pulse, as will appear more fully hereafter. The mode suppressor described is equally applicable to the form of oscillating loop shown in Figure 1, as well as to other broad band oscillating loops, such as the loop in which the modulator normally is "off."

Figure 4:
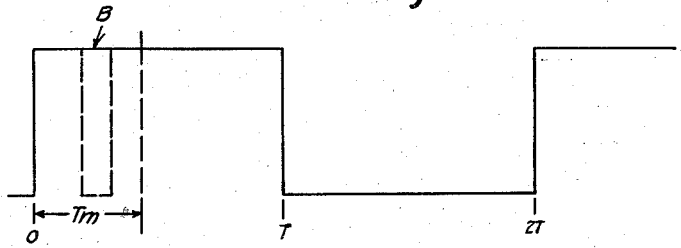
Figure 4 is a diagram similar to that of Figure 3, showing the action of the mode suppressor in suppressing a disturbance.
Figure 5:
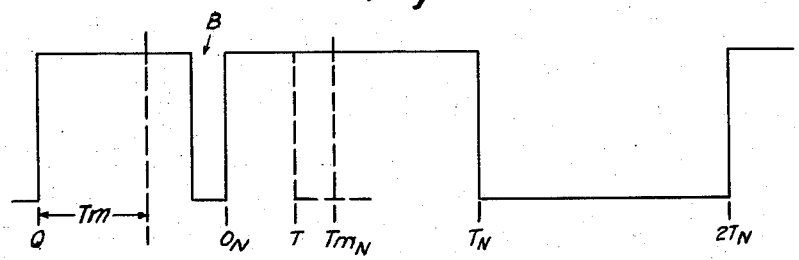
Figure 5 is a diagram similar to that of Figure 4 showing the action of the modes suppressor in suppressing a disturbance occurring at a time different from that shown in Figure 4.

A mode suppressor designed to provide a paralyzing pulse longer than one-half of the transit time of the ultrasonic vibrations between the transmitter 12 and the receiver 13 will suppress all modes higher than the fundamental. Referring now to Figure 4, it is seen that the carrier amplitude must remain unbroken for the period $T_m$ (the time of the paralyzing pulse furnished by the mode suppressor). If a disturbance such as a noise pulse should take place, prior to the termination of $T_m$ (such as dotted lines B in Fig. 4), the carrier amplitude will not be interrupted and the form of oscillation will continue in the normal fundamental manner as shown by the solid lines of the diagram. If the disturbance should take place after the termination of $T_m$ shown as solid lines B in Figure 5, the transmitted carrier will contain the break since there is no longer any mechanism to prevent it. However, at a time T from zero when the received image of the rising edge of 0 ordinarily would cut off the modulator (dotted line T), the mode suppressor previously activated by the rising edge of break B prevents this cutting off, and normal operation must proceed using $O_n$ as the effective new zero starting time for normal operation. It is, therefore, seen that the mode suppressor in this case enables the oscillator to reject a previous start which is improper and begin proper operation from the rising edge of a break. The suffix "N" in Figure 5 shows the new time relationship upon proper operation of the loop. It can also be seen that there cannot be a perpetuated false break. Such a false break cannot even be perpetuated if it is an infinitesimally small disturbance occurring directly after the conclusion of $T_m$, if time T falls within the next succeeding period $T_m$.

Figure 6:
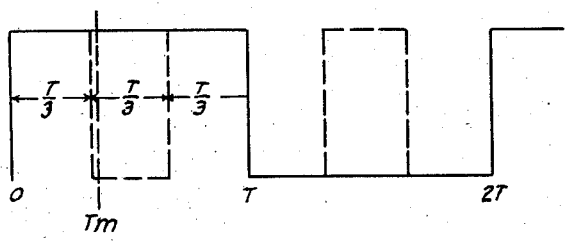
Figure 6 is a diagram similar to that of Figure 4 showing the action of the modes suppressor in suppressing a third harmonic mode.

Therefore, if $2T_m=T$, or $T_m=\frac{1}{2}T$, all modes except the fundamental will be suppressed. The lowest undesirable, symmetrical higher mode of oscillation (for a circuit as illustrated in Fig. 1) which may be perpetuated in a symmetrical manner, is the third harmonic mode. The wave shape, but for the action of the mode suppressor, is shown in dotted lines in Figure 6. This mode is suppressed by a slightly longer pulse than only one third of the frequency of the fundamental mode, as clearly appears from Figure 6.

Since the period of the paralyzing pulse is best adjusted to be slightly larger than one half of duration of the pulse, it is to be noted that fluids having velocities of ultrasonic propagation of a range of almost 2 to 1 may be measured without changing the time constant of the mode suppressor.

Reference will now be had to Figure 7 and 7a, where the circuit of the mode suppressor and its relation to the flow meter is indicated in detail. Power supplies are omitted since they are conventional. Representative values of circuit elements are indicated on the drawing, where they are important for a complete understanding of the invention. Values of conventional circuit elements, such as bypass condensers, filter and load resistors, etc. are omitted for clarity.

The wave generator 14 (see also Fig. 1), which may be of any well known construction, supplies excitation at ultrasonic frequency, for example, 10 mc. to modulator 15, which includes a tube 50 connected as cathode modulator. Tube 50, which may be a type 6AH6 pentode, has its control grid 51 biased for normal amplification, unless a signal is received by receiving transducer 13, as will appear more fully hereafter. The output of modulator tube 50, appearing at lead 52, drives another tube 53 (which may be a half section of a tube type 12AT7) connected as a cathode follower. Tube 53 acts as low impedence driver for the 10 mc. transmitting transducer 12.

The transmitting transducer 12 will then transmit ultrasonic vibrations through the fluid medium in pipe 11, to the receiving transducer 13. The time elapsed between the start of transmission of the first ultrasonic wave through the fluid medium and its reception by the receiving transducer will be a function of the velocity of propagation in the still fluid as well as of the flow velocity of the fluid in pipe 11, and this elapsed time is used to measure the velocity of the flow.

The receiving transducer 13, which is tuned to 10 mc., is connected by means of a coaxial R.-F. cable to a resistance loaded tuning inductance and then to the input of tube 54, which again may be half of tube type 12AT7. Tube 54 is connected as a cathode follower. The output of this tube appearing at lead 55 feeds the input of R.-F. amplifier 16, where shown as including tube 56. The plate circuit of tube 56 is a resonant inductance-resistance network 57, and drives a phase inverter circuit, well known in the art. This circuit includes a tube unit 58 (which again may be a half section of a type 12AT7 tube) and is connected by means of leads 59 and 60 to a double diode tube 61, connected as a full-wave detector. Tube 61 may be, for example, a type 6AL5. The D.-C. output voltage developed by tube 61 is filtered in a filter circuit 62 and applied by means of lead 63 to a tube unit 64, which is here shown as the second section of 12AT7 tube used for tube unit 58. The tube unit 64 is shown connected as a cathode follower. This cathode follower will supply a negative bias by means of lead 65 to grid 51 of tube 50 when a signal is impressed thereon, thereby cutting off tube 50 and in turn cutting off the supply of excitation from the carrier generator 14 to the transmitting transducer 12.

It is, therefore, seen that whenever a signal appears at the receiving transducer, the amplified and rectified signal places a negative voltage on the grid 51. Tube 50, therefore, serves as a modulator.

The description of the circuit of the flow meter has been given for a clear understanding of the operation of the mode suppressor now to be described.

The mode suppressor 20 is connected by means of lead 24 to the transmitting transducer (see also Fig. 1). Lead 24 is connected to a diode detector 70, which may be of a type 1N34A. This diode detector 70 rectifies the signal appearing across the transmitting transducer. A bleeder resistor 72 connects the diode detector 70 to ground. The rectified signal will appear as a square wave impulse, whose frequency is determined by the transit time of the ultrasonic vibrations between transmitting transducer 12 and receiving transducer 13. This impulse of square wave shape is applied over lead 73, here shown as a shielded cable, to the differentiating network 22, consisting of a condenser 74 and a resistor 75. Lead 76 connects the output signal from the differentiating network to a monostable multivibrator 78. The rise in voltage upon the appearing of a signal on the transmitting transducer, as rectified by detector 21, will trigger the multivibrator 78. The timing of the multivibrator 78 is determined by the fixed constants in the circuit. The circuit of the multivibrator itself is conventional and is not further described in detail. The pulse forming the output of the multivibrator is taken by means of lead 25 and applied across a portion of grid return resistor 79 of tube 56, which is the R.-F. amplifier. This output pulse will introduce a large negative voltage into the grid circuit of tube 56 and disable or paralyze the operation thereof, so that no amplification of any receiving signal can take place which, in turn, will block the application of any negative signal into the modulator tube 50, so that modulator tube 50 will permit excitation from carrier 14 to be applied to the transmitting transducer 12 for so long as the multivibrator 78 supplies a negative signal over lead 25.

In addition to applying the negative block to tube 56, the output from the multivbrator is also taken over lead 80 to a tube unit 82, which may be the second half of the 12AT7 tube containing unit 54. Tube 82 is connected as a diode and operates as a D.-C. restorer, connected in shunt with resistor 79, so that only negative blocks from the mode suppressor will appear across the resistor 79. The negative block applied to tube 56 must be large enough to bias tube 56 to cut-off.

The timing of the multivibrator may be varied by varying the resistor condenser network of the multivibrator circuit as is shown by the arrows in Figure 7a and as is well known in the art.

A frequency meter 18 which measures the frequency of the rectified pulses of period 2T (or T, if the alternative circuit in which the modulator is normally "off" is used) may be connected to lead 85. Lead 85 is conveniently connected to a point in the circuit where a rectified signal already appears, for example to detector 70 as shown; alternatively the frequency meter may also be connected to the output of detector 17, lead 63, lead 65, or the frequency meter may be equipped with its own detector and connected anywhere in the circuit. If the frequency of the loop is to be compared with the frequency of a similar loop, but of different spacial orientation with respect to the first loop, then lead 85 may be connected to such comparator circuit 19.

It is therefore seen that I provide apparatus for suppressing undesirable disturbances in broad band oscillatory circuits by obtaining an impulse over lead 24 from the oscillatory circuit upon starting of oscillations. The thus obtained impulse is differentiated in network 22, and the differentiated impulse is utilized to control a timed circuit 23. Circuit 23 furnishes a pulse of accurately timed duration which is applied over lead 25 to control the oscillatory circuit in such a manner that reintroduction of the disturbance into the circuit will be prevented so that the disturbance will be suppressed.

It is understood that various changes may be made in the circuits, and the specific embodiment described in detail is illustrative only.

What is claimed is:

1. In a flow meter of the ultrasonic type having a signal generator, a transmitting transducer connected thereto, a receiving transducer, said transducers being arranged in acoustic contact with a fluid so that acoustic waves are propagated therebetween in a direction having a component parallel to the direction of flow of the fluid, an amplifier connected to said receiving transducer, and a modulator connected to, and controlled by received signals from said amplifier, said modulator being connected between the signal generator and the transmitting transducer for affecting the signals furnished the transmitting transducer by said signal generator; a connection from the transmitting transducer; a detector connected to said connection; a differentiating network connected to said detector; a timed pulse generating circuit connected to said differentiating network and furnishing a pulse upon being triggered by an impulse from the differentiating network; and circuit means applying the pulse from the pulse generating circuit to the amplifier to paralyze operation thereof for a predetermined time less than the period required for the waves to traverse the fluid and thereby prevent a spurious received signal from affecting the signals furnished by the signal generator to the transmitting transducer.

2. In a flow-meter having a carrier generator, a transmitting transducer connected to said carrier generator, and a receiving transducer, a fluid conduit, said transducers being mounted opposite each other in said fluid conduit so that waves are propagated between said transducers in a direction having a component parallel to the direction of fluid flow; a gating circuit interposed between the carrier generator and the transmitting transducer, said gating circuit normally permitting energy to pass from the carrier generator to the transmitting transducer; and connection means from the receiving transducer to said gating circuit to affect the condition of said gating circuit to block the transmission of energy from the carrier generator to the transmitting transducer when a signal is received by the receiving transducer, spurious mode suppession means responsive to the output of said gating circuit for preventing said connection means from affecting said gating circuit for a predetermined time less than the period required for said waves to traverse the fluid, and frequency measuring means connected to said gating circuit.

3. In a flow-meter according to claim 2, wherein said spurious mode suppression means includes a detector connected to the transmitting transducer, a timed pulse generating circuit connected to said detector to furnish a pulse, and means to apply said pulse to the gating circuit to prevent the gating circuit from being affected by a signal received by the receiving transducer.

4. A flow-meter of the ultrasonic type comprising an ultrasonic frequency wave generator means having an oscillating and a non-oscillating condition, a fluid conduit, transmitting and receiving transducers mounted in said fluid conduit so that acoustic waves are propagated through a fluid in the conduit from the transmitting transducer to the receiving transducer in a direction having a component parallel to the direction of fluid flow, means connecting the transmitting transducer to the output of the wave generator means and means connecting the receiving transducer to the wave generator means, circuit means connected to said generator and said transducers, said circuit means comprising means for producing a direct current blocking potential in response to the oscillating condition of said generator means and means for causing the blocking potential to prevent the wave generator means from changing from one condition to the other during the time that the blocking potential continues and frequency measuring means connected to said generator means.

5. A flowmeter of the ultrasonic type comprising a transmitting transducer, a receiving transducer, an ultrasonic frequency wave generator means and circuit means connected to said wave generator means and transducers, means for mounting said transducers with respect to a fluid so that acoustic waves emitted by the transmitting transducer are propagated through the fluid to the receiving transducer in a direction having a component parallel to the flow of the fluid, said circuit means including means for controlling the wave generator means in response to signals received from said receiving transducer, means for producing a direct current blocking potential having a duration greater than one-half the travel time of the acoustic waves through the fluid in response to oscillations of said generator means and means responsive to said blocking potential for preventing the received signals from controlling the wave generator means for the duration of said blocking potential and frequency measuring means connected to said circuit means.

References Cited in the file of this patent

UNITED STATES PATENTS

| | | |
|---|---|---|
| 2,141,343 | Campbell | Dec. 27, 1938 |
| 2,235,131 | Wheeler | Mar. 18, 1941 |
| 2,516,356 | Tull et al. | July 25, 1950 |
| 2,522,551 | Williams | Sept. 19, 1950 |
| 2,619,836 | Downing | Dec. 2, 1952 |
| 2,669,121 | Garmen et al. | Feb. 16, 1954 |
| 2,681,989 | Cunniff | June 22, 1954 |

FOREIGN PATENTS

| | | |
|---|---|---|
| 616,794 | Great Britain | Jan. 27, 1949 |
| 623,022 | Great Britain | May 11, 1949 |